United States Patent
Shi et al.

(10) Patent No.: US 11,514,946 B1
(45) Date of Patent: Nov. 29, 2022

(54) HEAT-ASSISTED MAGNETIC RECORDING (HAMR) SLIDER WITH STRAY LIGHT REMOVAL

(71) Applicant: Western Digital Technologies, Inc., San Jose, CA (US)

(72) Inventors: Norman Shi, Los Altos, CA (US); Takuya Matsumoto, San Jose, CA (US); Barry Cushing Stipe, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/522,404

(22) Filed: Nov. 9, 2021

(51) Int. Cl.
*G11B 11/10* (2006.01)
*G11B 13/08* (2006.01)
*G11B 5/00* (2006.01)

(52) U.S. Cl.
CPC ...... *G11B 13/08* (2013.01); *G11B 2005/0021* (2013.01)

(58) Field of Classification Search
CPC .................. G11B 11/10; G11B 11/105; G11B 2005/0021; G11B 5/6082; G11B 5/314; G11B 5/3133; G11B 5/3163; G11B 5/4866; G11B 5/6088; G11B 11/10506
USPC ..................................................... 360/59, 328
See application file for complete search history.

(56) References Cited

U.S. PATENT DOCUMENTS

| 8,873,352 | B1 | 10/2014 | Jandric et al. |
| 8,934,198 | B2 * | 1/2015 | Zou ........................ G11B 5/314 360/125.31 |
| 9,466,320 | B1 | 10/2016 | Staffaroni et al. |
| 9,558,769 | B1 | 1/2017 | Kim et al. |
| 9,934,801 | B1 | 4/2018 | Wessel et al. |
| 10,127,937 | B1 | 11/2018 | Wessel et al. |
| 10,269,379 | B1 | 4/2019 | Goggin et al. |
| 10,297,282 | B1 | 5/2019 | Wessel |
| 10,748,572 | B1 | 8/2020 | Yang et al. |
| 2009/0262608 | A1 | 10/2009 | Kurita et al. |
| 2012/0051195 | A1 | 3/2012 | Shimizu |
| 2015/0154988 | A1 | 6/2015 | Takei et al. |
| 2015/0194172 | A1 | 7/2015 | Peng et al. |

OTHER PUBLICATIONS

International Search Report and Written Opinion for International Application No. PCT/US2022/029341 dated Oct. 18, 2022.

* cited by examiner

*Primary Examiner* — Nabil Z Hindi
(74) *Attorney, Agent, or Firm* — Patterson & Sheridan, LLP; Steven H. VerSteeg

(57) ABSTRACT

A heat-assisted magnetic recording (HAMR) disk drive uses a semiconductor laser mounted on a slider to deliver light to a near-field transducer (NFT) via a waveguide located inside the slider. The waveguide includes a core and cladding material that is transparent to the laser light and surrounds the core. Layers of stray light absorption material are located inside the slider on opposite edges of the waveguide core in the same plane as the core and on opposite sides of the waveguide core in planes spaced from the plane of the core. Portions of the waveguide cladding material are located between the waveguide core and the stray light absorption layers. The stray light absorption layers absorb light that leaks into the cladding material and substantially reduces stray light reflected to the laser to prevent undesirable laser power fluctuation.

18 Claims, 8 Drawing Sheets

HEAT-ASSISTED MAGNETIC RECORDING (HAMR) SLIDER WITH STRAY LIGHT REMOVAL

TECHNICAL FIELD

This invention relates generally to heat-assisted magnetic recording (HAMR), wherein a laser source generates light to a near-field transducer (NFT) via an optical waveguide to heat a magnetic recording layer, and more specifically to an improved HAMR slider that removes stray light that leaks from the waveguide.

BACKGROUND

In conventional magnetic recording, thermal instabilities of the stored magnetization in the recording media can cause loss of recorded data. To avoid this, media with high magneto-crystalline anisotropy ($K_u$) are required. However, increasing $K_u$ also increases the coercivity of the media, which can exceed the write field capability of the write head. Since it is known that the coercivity of the magnetic material of the recording layer is temperature dependent, one proposed solution to the thermal stability problem is heat-assisted magnetic recording (HAMR), wherein high-$K_u$ magnetic recording material is heated locally during writing by the main magnetic pole to lower the coercivity enough for writing to occur, but where the coercivity/anisotropy is high enough for thermal stability of the recorded bits at the ambient temperature of the disk drive (i.e., the normal operating or "room" temperature of approximately 15-30° C.). In some proposed HAMR systems, the magnetic recording material is heated to near or above its Curie temperature. The recorded data is then read back at ambient temperature by a conventional magnetoresistive read head. HAMR disk drives have been proposed for both conventional continuous media, wherein the magnetic recording material is a continuous layer on the disk, and for bit-patterned media (BPM), wherein the magnetic recording material is patterned into discrete data islands or "bits".

HAMR disk drives typically have gas-bearing sliders maintained near the disk surfaces. Each slider supports a semiconductor laser source (e.g., a diode laser), a near-field transducer (NFT) for heating the recording material on the disk, and an optical waveguide coupled between the laser and the NFT. A "near-field" transducer refers to "near-field optics", wherein the passage of light is through an element with sub-wavelength features and the light is coupled to a second element, such as a substrate like a magnetic recording medium, located a sub-wavelength distance from the first element. The NFT is typically located at the gas-bearing surface (GBS) of the gas-bearing slider that also supports the read/write head and rides or "flies" above the disk surface.

SUMMARY

The waveguide is formed inside the slider and includes a core and cladding material that is transparent to the laser light and surrounds the core. Stray light can leak from the core through the transparent cladding material and reflect off slider structures and the slider/media interface back into the diode laser. The reflected light causes mode hop or frequency shifting of the diode laser which results in undesirable laser power fluctuation. The reflected light is increased if there is any misalignment of the diode laser from its desired position on the slider. Because there are tolerances in the diode laser location during manufacturing, there may always be some misalignment and thus increased reflected light.

In embodiments of this invention layers of stray light absorption material are located inside the slider on opposite edges of the waveguide core in the same plane as the core and on opposite sides of the waveguide core in planes spaced from the plane of the core. Portions of the waveguide cladding material are located between the waveguide core and the stray light absorption layers. The stray light absorption layers absorb light that leaks into the cladding material and substantially reduces stray light reflected into the diode laser.

For a fuller understanding of the nature and advantages of the present invention, reference should be made to the following detailed description taken together with the accompanying figures.

DETAILED DESCRIPTION

Figure 1:
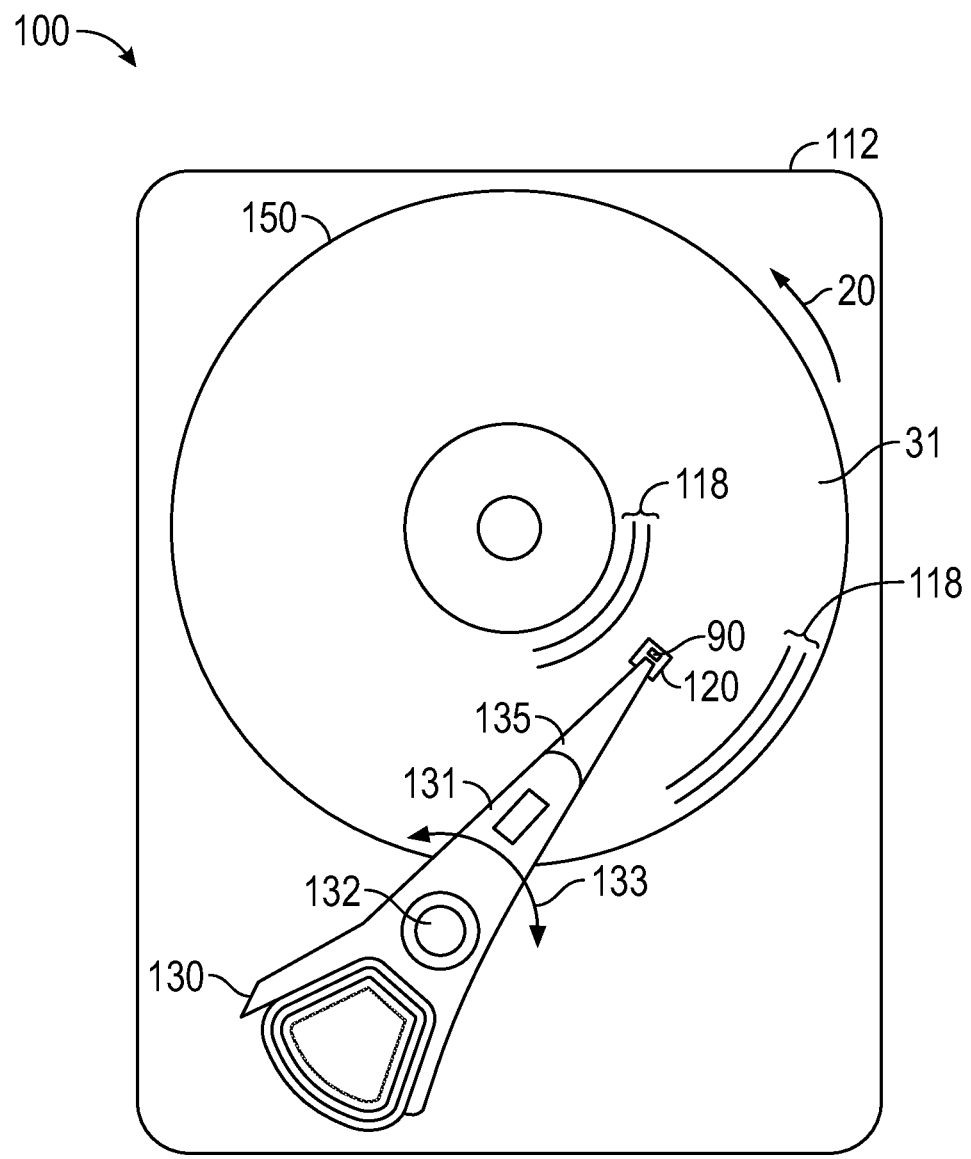
FIG. 1 is a top view of a heat-assisted magnetic recording (HAMR) disk drive according to an embodiment of the invention.

FIG. 1 is a top view of a heat-assisted recording (HAMR) disk drive 100 according to an embodiment of the invention. In FIG. 1, the HAMR disk drive 100 is depicted with a disk 150 with magnetic recording layer 31 of conventional continuous magnetic recording material arranged in radially-spaced circular tracks 118. Only a few representative tracks 118 near the inner and outer diameters of disk 150 are shown. However, instead of a conventional continuous magnetic recording layer, the recording layer may be a bit-patterned-media (BPM) layer with discrete data islands.

The drive 100 has a housing or base 112 that supports an actuator 130 and a drive motor for rotating the magnetic recording disk 150. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as a gas-bearing slider 120, attached to the other end of suspension 135. The suspension 135 permits the slider 120 to be maintained very close to the surface of disk 150 and enables it to "pitch" and "roll" on the bearing of gas (typically air or helium) generated by the disk 150 as it rotates in the direction of arrow 20. The slider 120 supports the HAMR head (not shown), which includes a magnetoresistive read head, an inductive write head, the near-field transducer (NFT) and optical waveguide. A semiconductor laser 88 with a wavelength of 780 to 980 nm may used as the HAMR light source and is depicted as being supported on the top of slider 120. As the disk 150 rotates in the direction of arrow 20, the movement of actuator 130 allows the HAMR head on the slider 120 to access different data tracks 118 on disk 150. The slider 120 is typically formed of a composite material, such as a composite of alumina/titanium-carbide ($Al_2O_3$/TiC). Only one disk surface with associated slider and read/write head is shown in FIG. 1, but there are typically multiple disks stacked on a hub that is rotated by a spindle motor, with a separate slider and HAMR head associated with each surface of each disk.

Figure 2:
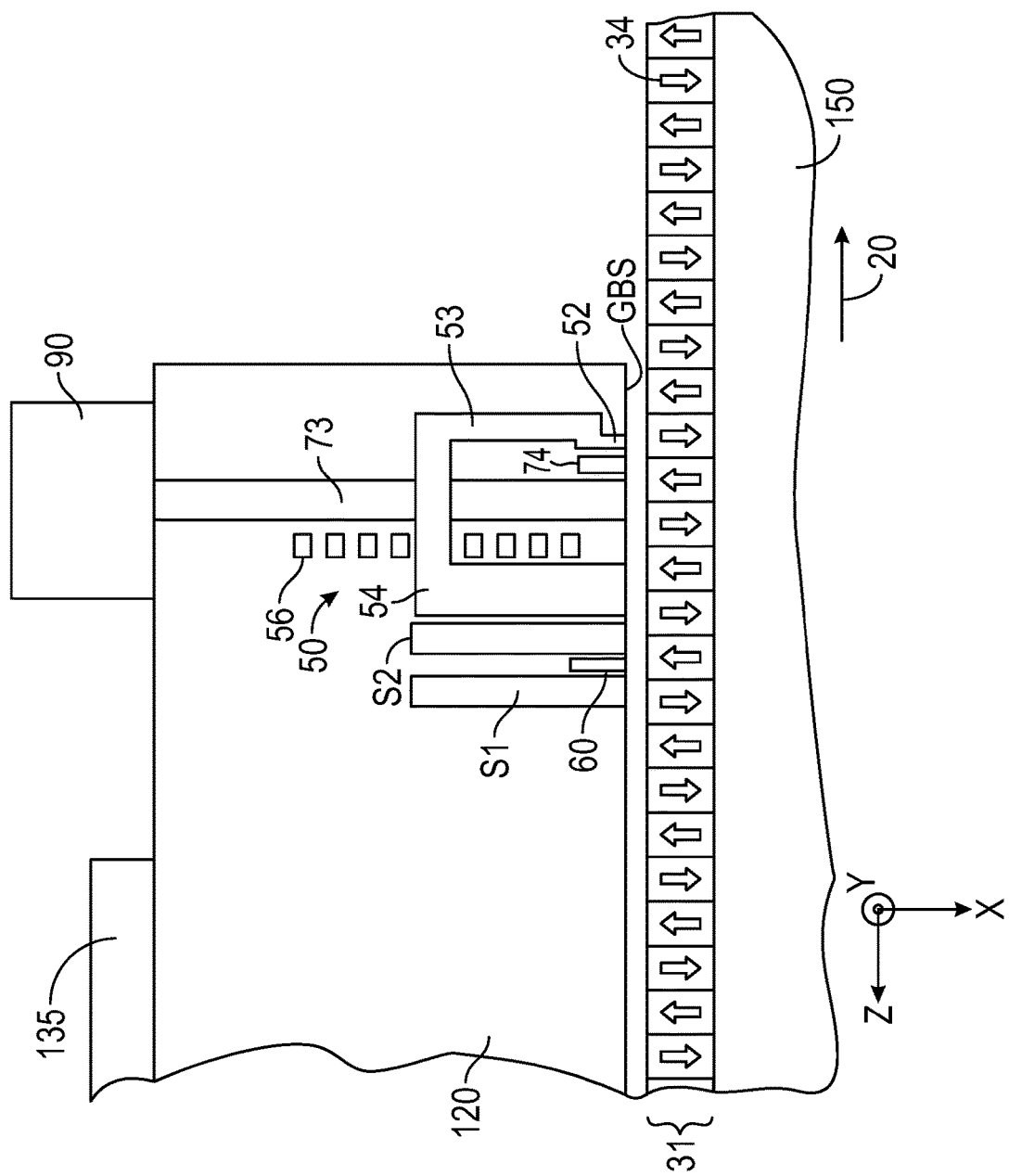
FIG. 2 is a side a sectional view, not drawn to scale because of the difficulty in showing the very small features, of a gas-bearing slider for use in a HAMR disk drive and a portion of a HAMR disk according to the prior art.

In the following drawings, the X-axis denotes an axis perpendicular to the gas-bearing surface (GBS) of the slider, the Y-axis denotes a track width or cross-track axis, and the Z-axis denotes an along-the-track axis. FIG. 2 is a schematic cross-sectional view illustrating a configuration example of a HAMR head according to the prior art. In FIG. 2, the disk 150 is depicted with the recording layer 31 being a conventional continuous magnetic recording layer of magnetizable material with magnetized regions or "bits" 34. The gas-bearing slider 120 is supported by suspension 135 and has a GBS that faces the disk 150 and supports the magnetic write head 50, read head 60, and magnetically permeable read head shields S1 and S2. A recording magnetic field is generated by the write head 50 made up of a coil 56, a primary magnetic pole 53 for transmitting flux generated by the coil 56, a main pole 52 connected to the primary pole 53, and a return magnetic pole 54 coupled to the primary pole 53 and main pole 52. A magnetic field generated by the coil 56 is transmitted through the primary pole 53 to the main pole 52 arranged in a vicinity of an optical near-field transducer (NFT) 74. FIG. 2 illustrates the write head 50 with a well-known "pancake" coil 56, wherein the coil segments lie in substantially the same plane. However, alternatively the coil may be a well-known "helical" coil wherein the coil is wrapped around the primary magnetic pole 53. At the moment of recording, the recording layer 31 of disk 150 is heated by an optical near-field generated by the NFT 74 and, at the same time, a region or "bit" 34 is magnetized and thus written onto the recording layer 31 by applying a recording magnetic field generated by the main pole 52.

A semiconductor laser 90 is mounted to the top surface of slider 120. A diode laser is one type of semiconductor laser. Other types include a vertical cavity surface emitting laser (VCSEL). An optical waveguide has a core 73 for guiding light from laser 90 to the NFT 74. The waveguide includes the core 73 and surrounding cladding material (not shown) and is formed inside the slider 120. Materials that ensure that the refractive index of the waveguide core 73 is greater than a refractive index of the surrounding cladding material may be used for the waveguide core 73. For example, $Al_2O_3$ or $SiO_2$ may be used as the cladding material and $TiO_2$, $Ta_2O_5$ or $SiO_xN_y$ as the core material.

Figure 3:
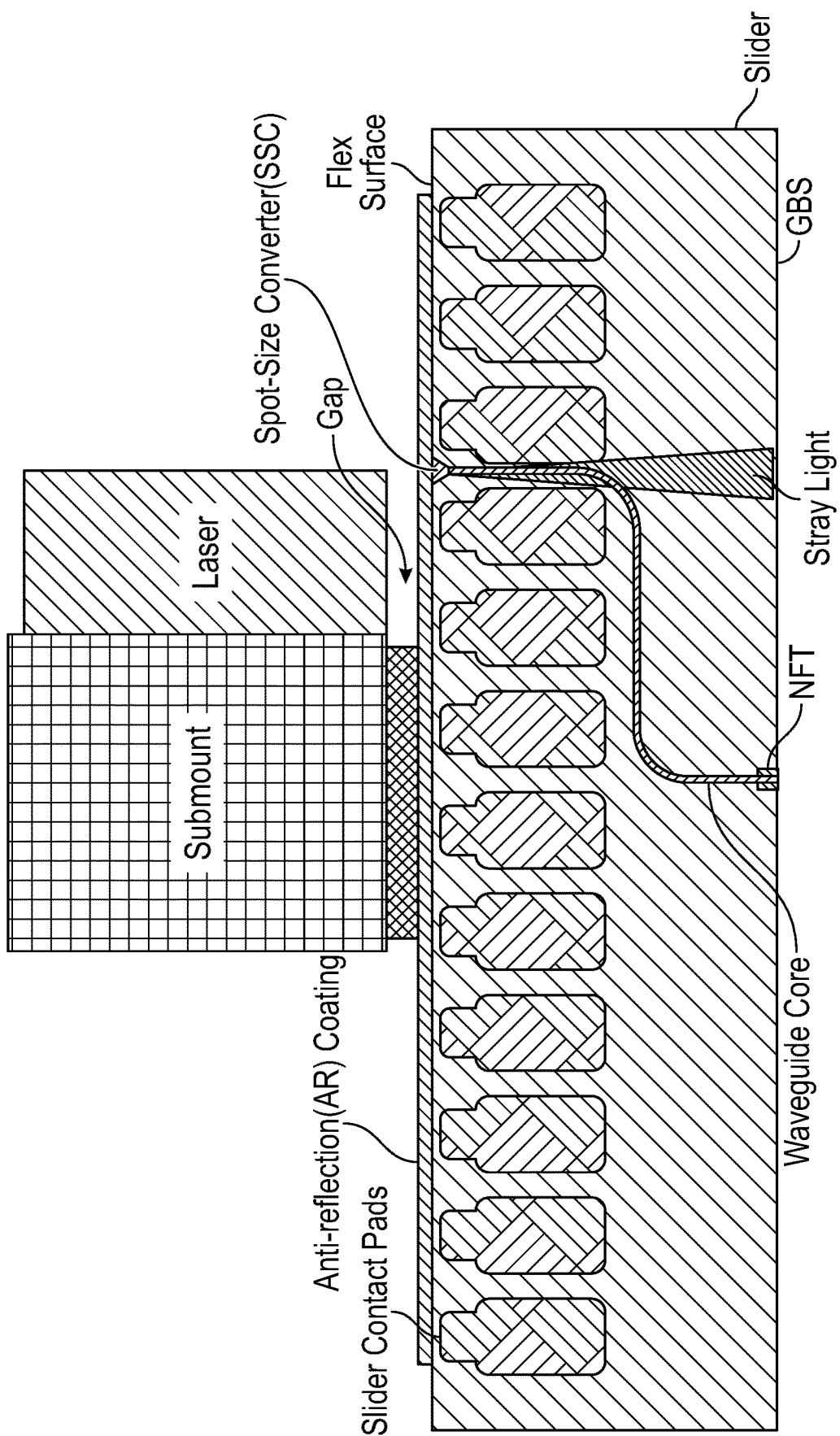
FIG. 3 is a side sectional view of a slider according to the prior art illustrating the problem of stray light.

FIG. 3 is a side sectional view of a slider according to the prior art illustrating the problem of stray light. A semiconductor laser, preferably a diode laser, is mounted to a submount which is mounted on a first or upper surface (also called the flex surface) of the head carrier, which may be a gas-bearing slider. The slider includes contact pads for electrical connection of the various slider components (e.g., read and write heads, fly-height control heater) to the disk drive hardware. The NFT is located at the slider's second surface or GBS which is substantially parallel to the flex surface. The diode laser transmits light through a gap to a spot-size converter (SSC) formed on the end of the waveguide core. An anti-reflection coating (e.g., $Ta_2O_5$+$SiO_2$) is typically formed on the flex surface. The waveguide core is formed inside the slider and transmits the light to the NFT. In this example, unlike the straight-line shape of the waveguide core in FIG. 2, the waveguide core may have multiple bends. The waveguide includes cladding material (not shown) that is transparent to the light and surrounds the core. Stray light leaks from the core through the transparent cladding material and reflects off slider structures and the slider/media interface back to the diode laser. The reflected light causes mode hop or frequency shifting of the diode laser which results in undesirable diode laser power fluctuation.

Figure 4:
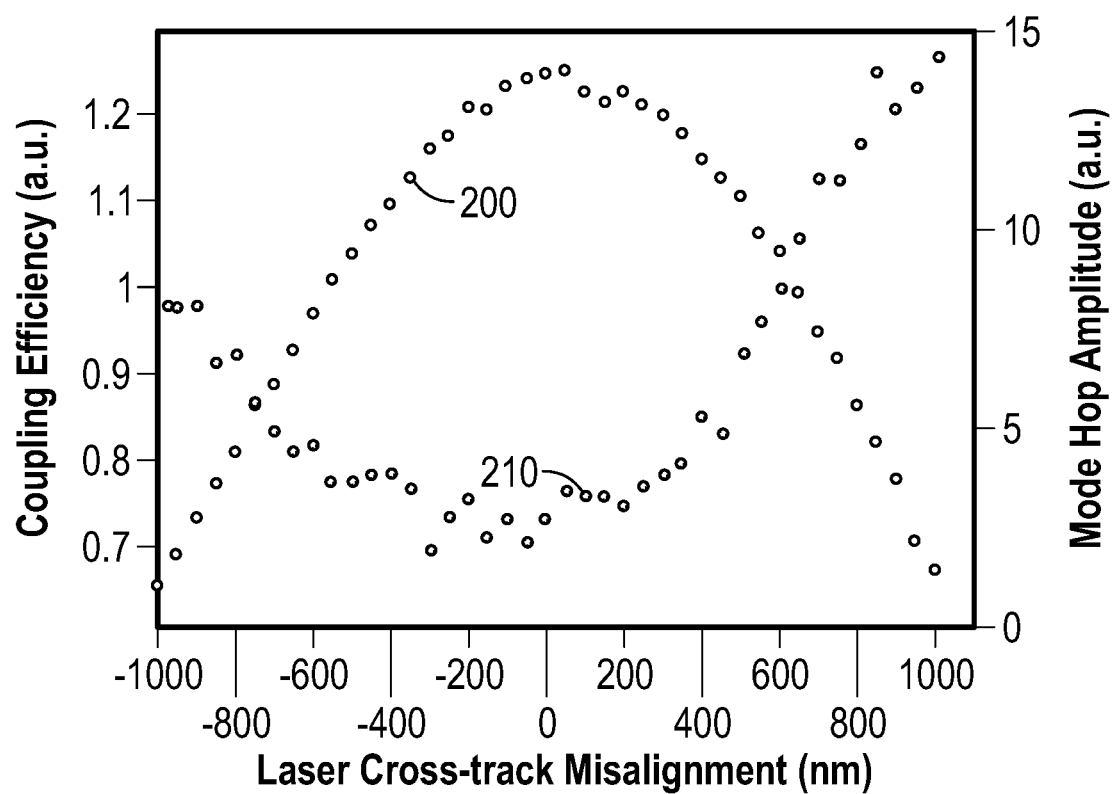
FIG. 4 shows the percentage of coupling efficiency at the near-field transducer (NFT) (curve 200) and the percentage of mode hop power fluctuation at the NFT (curve 210) as a function of cross-track misalignment of the diode laser on the slider flex surface.

Even if the diode laser is precisely aligned on the slider flex surface, there will be light leaking from the waveguide cladding and thus stray light reflected to the diode laser. However, experimental studies have shown that when the diode laser is misaligned just a small amount from its desired position on the slider flex surface, there is an increase in reflected stray light, which in turn causes instability in the diode laser power. Because there are tolerances in the diode laser location during manufacturing, there may always be some diode laser misalignment and thus increased reflected light. FIG. 4 shows the coupling efficiency (in arbitrary units a.u.) at the NFT (curve 200) and the mode hop amplitude (power fluctuation) (in arbitrary units a.u.) at the NFT (curve 210) as a function of cross-track misalignment of the diode laser. The coupling efficiency is highest and the mode hop amplitude is lowest at 0 misalignment, but the coupling efficiency decreases and the mode hop power fluctuation increases with increasing misalignment.

Figure 5:
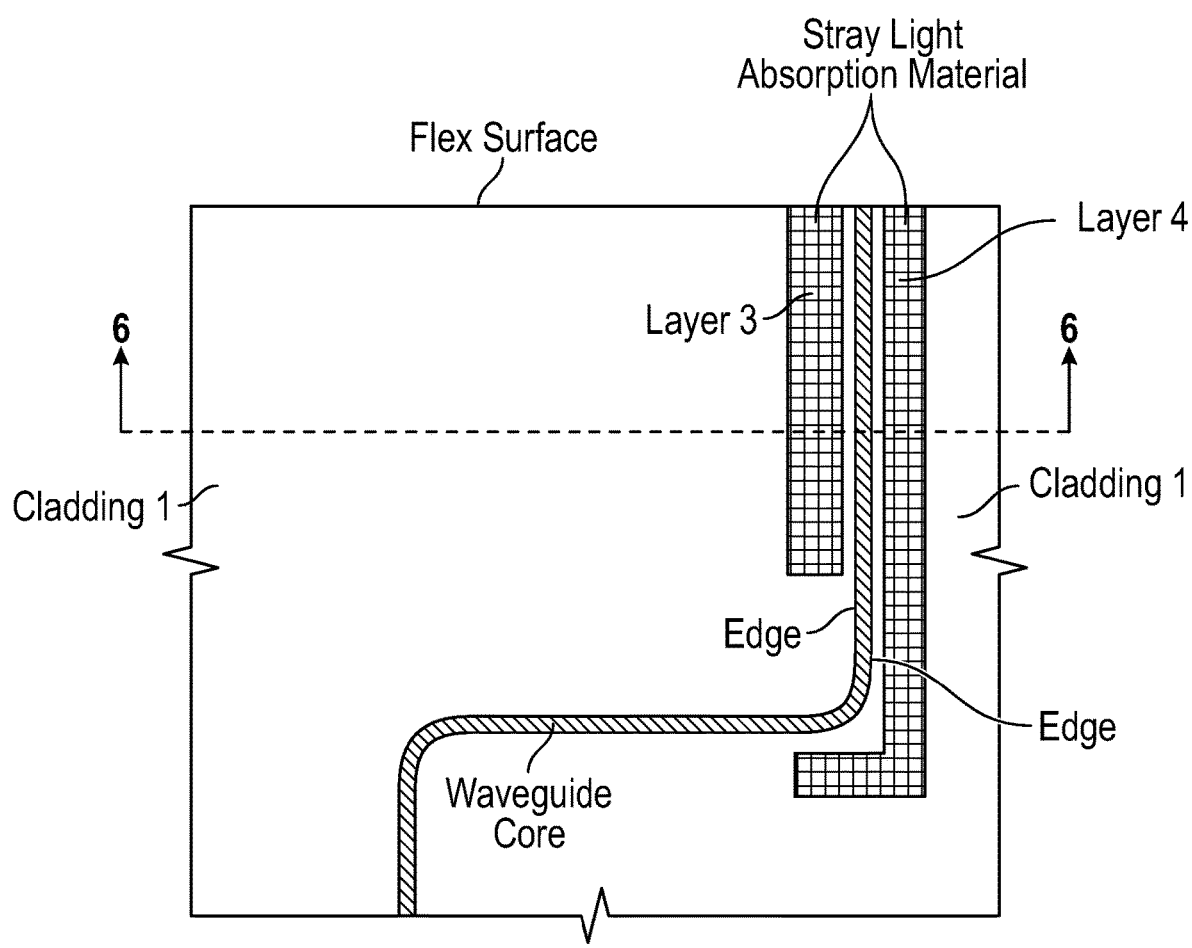
FIG. 5 is a side sectional view through a plane containing the waveguide core and illustrates two layers (layers 3 and 4) of the stray light absorption material located in the plane of the core on opposite edges of the waveguide core according to an embodiment of the invention.

In embodiments of this invention stray light absorption material is located within the cladding material and spaced around the core, with portions of cladding material located between the stray light absorption material and the core. The stray light absorption material extends from the first slider surface toward the second slider surface. The stray light absorption material may be formed as layers located inside the slider on opposite edges of the waveguide core in the same plane as the core and on opposite sides of the waveguide core in planes spaced from the plane of the core. FIG. 5 is a side sectional view through a plane containing the waveguide core and illustrates two layers (layers 3 and 4) of the stray light absorption material located in the plane of the core on opposite edges of the waveguide core. FIG. 5 also illustrates cladding material 1 located in the same plane as the waveguide core adjacent the core edges. The cladding material can cover the full surface of the plane containing the waveguide core, as shown in FIG. 5, or can extend only a certain distance from the core edges.

Figure 6:
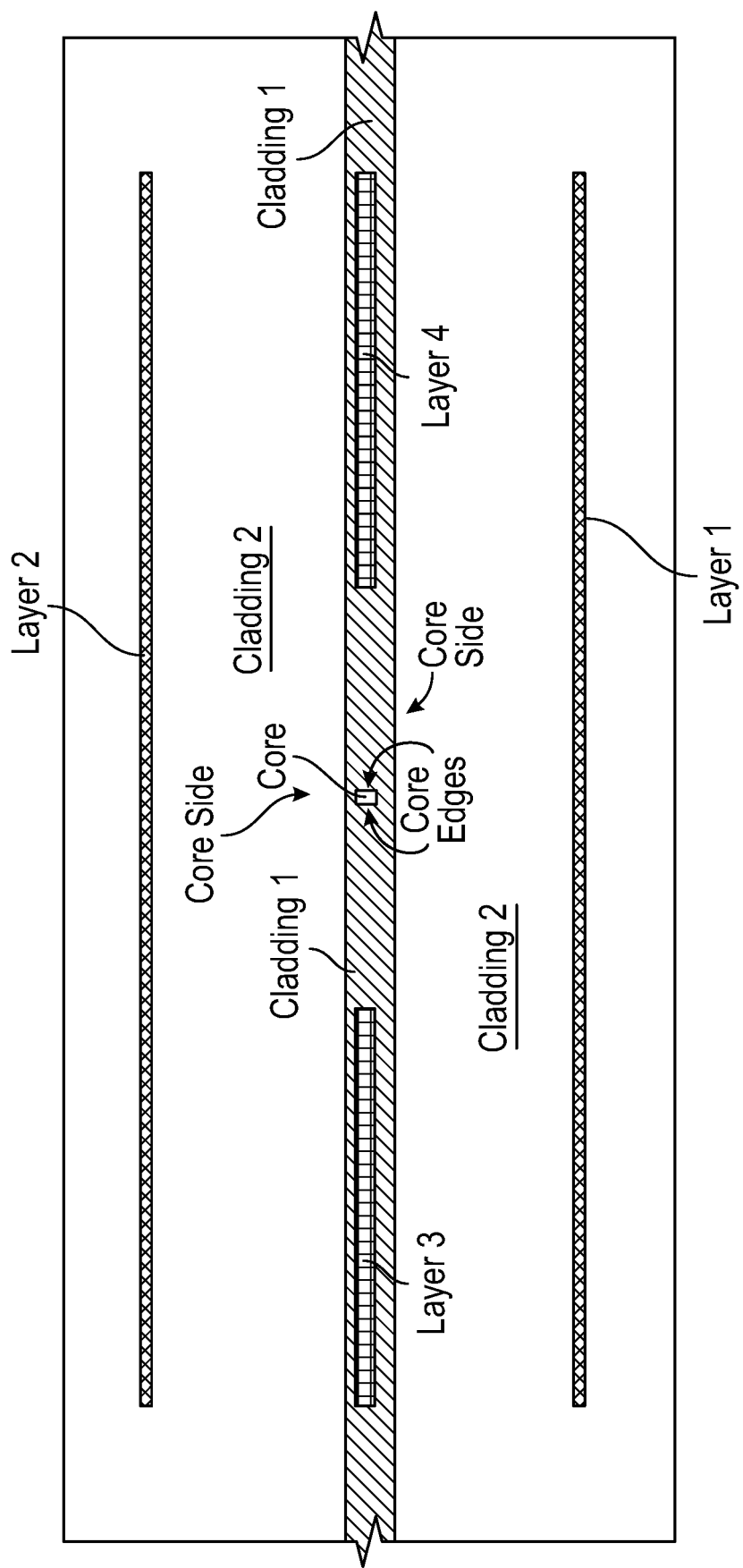
FIG. 6 is a view of section 6-6 of FIG. 5, which is a plane parallel to the first and second planes of the slider, and illustrates cladding material substantially surrounding the waveguide core and the four layers of stray light absorption material according to an embodiment of the invention.

FIG. 6 is a view of section 6-6 of FIG. 5, which is a plane parallel to the first and second planes of the slider, and illustrates cladding material substantially surrounding the waveguide core and the four layers of stray light absorption material. Cladding material 1 may be SiO$_2$ and is in substantially the same plane as the core. Layers 3 and 4 are located on opposite edges of the core and cladding material 1 in substantially the same plane as the core. Cladding material 2 may be Al$_2$O$_3$ and is on opposite sides of the core in planes substantially parallel to the core plane. The stray light absorption layers are located around the cladding material that substantially surrounds the core and thus absorb light leaking from the surrounding cladding material, thereby preventing or substantially reducing reflection back to the diode laser. Layers 1 and 2 have a preferred thickness in the range of 20 to 400 nm. Layers 3 and 4 have a preferred thickness in the range of 20 to 400 nm. If layers 3 and 4 are thicker than about 300 nm they may contribute to additional reflection.

Figure 7A:
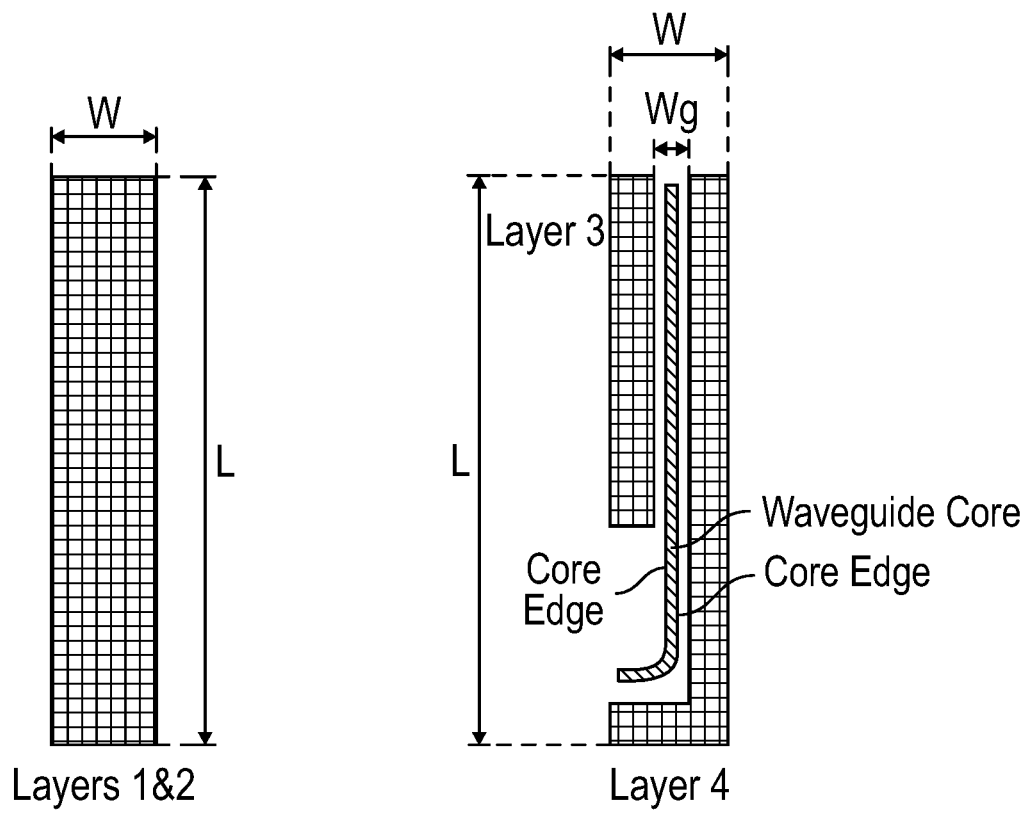
FIG. 7A shows the shape of the stray light absorption layers according to an embodiment of the invention in the planes of the layers.
Figures 7B, 7C:
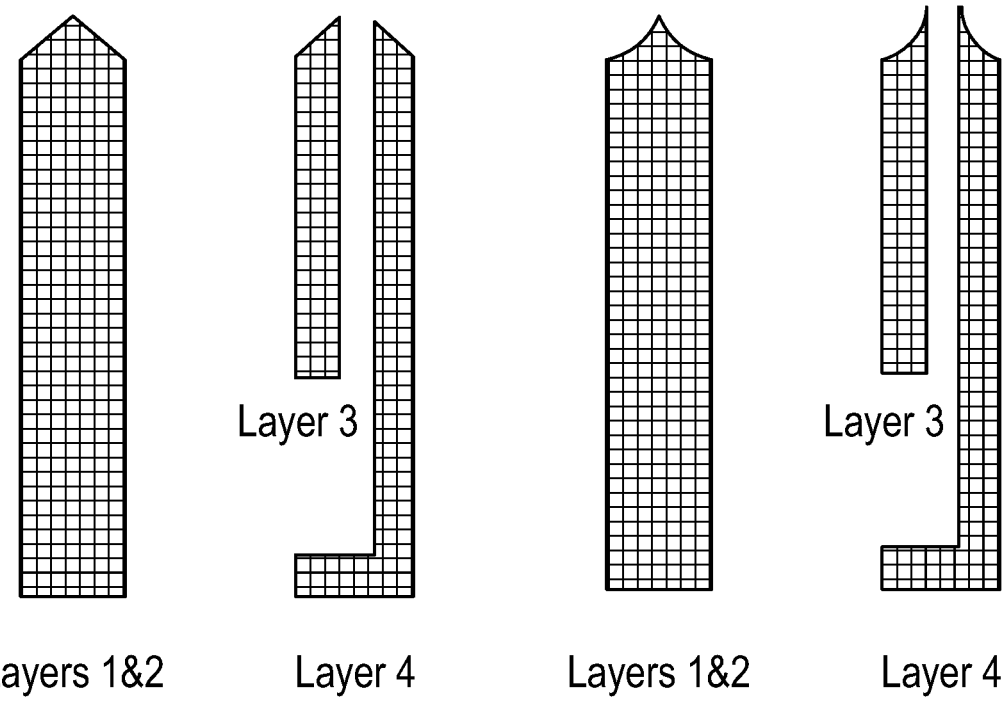
FIG. 7B shows an embodiment of the stray light absorption layers according to an embodiment of the invention wherein the ends of the layers near the flex surface form an angle relative to the flex surface.
FIG. 7C shows an embodiment of the stray light absorption layers according to an embodiment of the invention wherein the ends of the layers near the flex surface form curved ends relative to the flex surface.

FIG. 7A shows the shape of the stray light absorption layers in the planes of the layers. The width W of layers 1 and 2 are depicted as having the same width as the combined width W of layers 3 and 4. Layers 3 and 4 are spaced on opposite edges of the waveguide core to allow for a width of the cladding material between the core and layers 3 and 4 of at least 4 times the width of the core. In one example the core may have an edge-to-edge width of about 0.4 to 0.8 mm, W may be about 20 mm and Wg may be about 6 mm. The layers have a preferred length L to extend from the flex surface to a least the first bend of the core, as shown in FIG. 7A, or all the way to near the NFT if the core is a straight line from the flex surface to the GBS. FIG. 7B shows an embodiment of the layers wherein the ends of the layers near the flex surface form an angle relative to the flex surface, and FIG. 7C shows an embodiment of the layers wherein the ends of the layers near the flex surface form curved ends relative to the flex surface. In both embodiments, the tapered ends of the layers can reduce reflection back to the diode laser.

The stray light absorption layers should be formed of a material with a high extinction coefficient k at the diode laser wavelength to enable effective absorption of stray light. The materials should also be able to withstand high thermal stress. Preferred materials include both metal and metal alloy materials (k preferably greater than 1) like Ru, Co, Cr, W, NiFe, CoFe, NiTa and RuAl, or a metal alloy containing at least 10 atomic percent of one or more of Cr, Ni, Ta and Ru, as well as lossy dielectric materials (k preferably greater than 0.3) like C, GaAs and Si. The stray light absorption layers may also be multilayers of different ones of these materials, as well as multilayers wherein one of the layers, in addition to a layer of stray light absorption material, is a layer of a high thermal conductivity material, like Cu or Au, to act as a heat sink to avoid high temperature rise caused by the light absorption.

Figure 8:
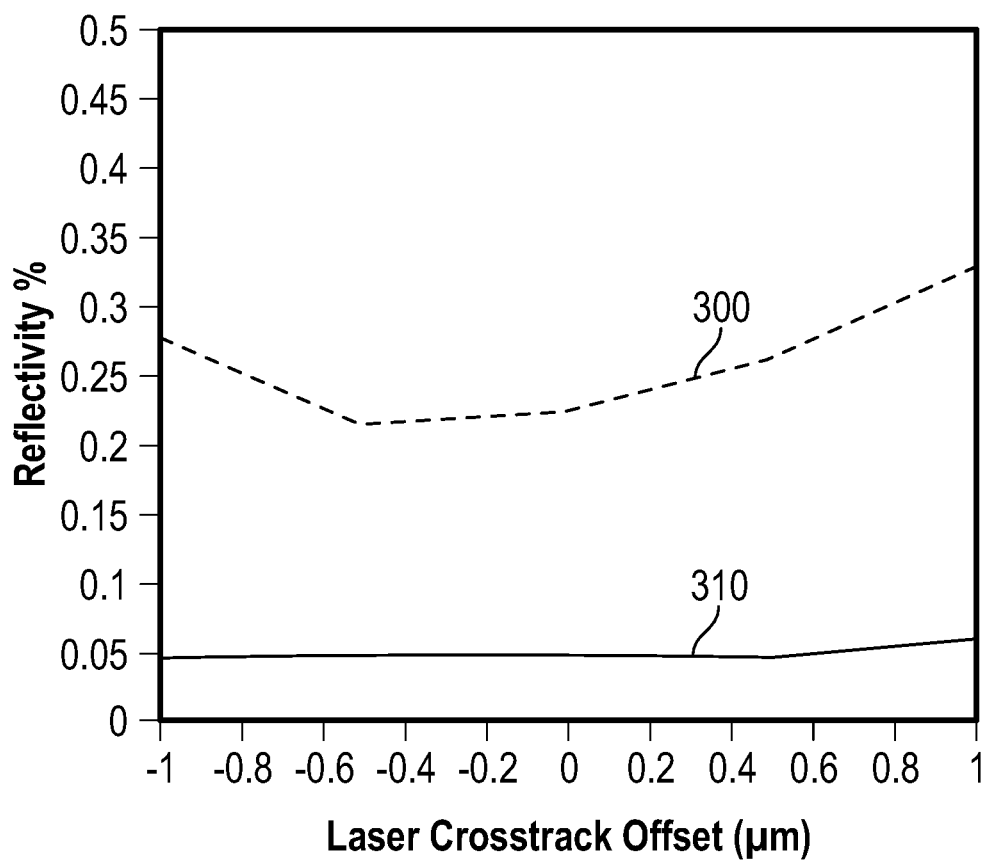
FIG. 8 is a graph of a computer simulation showing the reflectivity without stray light absorption layers (curve 300) and with stray light absorption layers formed of Ru (curve 310) as a function of cross-track offset of the diode laser (diode laser).

FIG. 8 is a graph of a computer simulation showing the reflectivity without stray light absorption layers (curve 300) and with the stray light absorption layers formed of Ru (curve 310) as a function of cross-track offset of the diode laser. The overall reflection back into the diode laser is reduced by about 80% with the stray light absorption layers.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A heat-assisted magnetic recording (HAMR) head carrier having first and second spaced-apart substantially parallel surfaces, the head carrier comprising:
    a semiconductor laser on the first surface;
    a near-field transducer (NFT) having an output end at the second surface;
    a waveguide on the head carrier comprising a core in a plane substantially orthogonal to the first and second head carrier surfaces and extending from the first head carrier surface toward the second head carrier surface, the core being optically coupled to the laser and the NFT, and cladding material surrounding the core; and
    stray light absorption material located within the cladding material and spaced around the core, wherein portions of cladding material are located between the stray light absorption material and the core, the stray light absorption material extending from the first head carrier surface toward the second head carrier surface.

2. The HAMR head carrier of claim 1 further comprising an anti-reflection coating on the first surface of the head carrier.

3. The HAMR head carrier of claim 1 wherein the waveguide core further comprises a spot-size converter near the first surface of the head carrier.

4. The HAMR head carrier of claim 1 wherein the stray light absorption material is formed of a material having an extinction coefficient k greater than 0.3.

5. The HAMR head carrier of claim 1 wherein the stray light absorption material is selected from Ru, Co, Cr, W, NiFe, CoFe, NiTa, RuAl, an alloy containing at least 10 atomic percent of one or more of Cr, Ni, Ta and Ru, and C, GaAs and Si.

6. The HAMR head carrier of claim 1 wherein the waveguide core includes at least two bends between the laser and the NFT, wherein the core extends in a substantially straight line from the first head carrier surface to the bend closest to the first head carrier surface and the stray light absorption material extends from the first head carrier surface to the bend closest to the first head carrier surface.

7. The HAMR head carrier of claim 1 wherein the cladding material comprises edge cladding material located at the edges of the core in substantially the same plane as the core and side cladding material located on opposite sides of the plane containing the core and edge cladding material, and wherein the stray light absorption material comprises:
    first and second stray light absorption layers on opposite sides of the side cladding material and extending from near the first head carrier surface toward the second head carrier surface, the first and second stray light absorption layers being substantially parallel to the plane of the core and edge cladding material, and
    third and fourth stray light absorption layers on opposite edges of the edge cladding material and extending from near the first head carrier surface toward the second head carrier surface, the third and fourth stray light absorption layers being substantially coplanar and substantially parallel to the first and second stray light absorption layers.

8. The HAMR head carrier of claim 7 wherein one of more of the stray light absorption layers comprises a multilayer of different materials.

9. A heat-assisted recording (HAMR) disk drive comprising:
the HAMR head carrier of claim 1 further comprising a magnetic write head and magnetoresistive read head on the head carrier; and
a magnetic recording disk having a magnetic recording layer.

10. A heat-assisted magnetic recording (HAMR) slider having first and second spaced-apart substantially parallel surfaces, the slider comprising:
a diode laser on the first surface;
a near-field transducer (NFT) having an output end at the second surface;
a waveguide on the slider comprising a core in a plane substantially orthogonal to the first and second slider surfaces and optically coupled to the diode laser and the NFT, edge cladding material located at the edges of the core in substantially the same plane as the core, and side cladding material located on opposite sides of the plane containing the core and edge cladding material;
first and second stray light absorption layers on opposite sides of the side cladding material and extending from near the first slider surface toward the second slider surface, the first and second stray light absorption layers being substantially parallel to the plane of the core and edge cladding material; and
third and fourth stray light absorption layers on opposite edges of the edge cladding material and extending from near the first slider surface toward the second slider surface, the third and fourth stray light absorption layers being substantially coplanar and substantially parallel to the first and second stray light absorption layers.

11. The HAMR slider of claim 10 further comprising an anti-reflection coating on the first surface of the slider.

12. The HAMR slider of claim 10 wherein the waveguide core further comprises a spot-size converter near the first surface of the slider.

13. The HAMR slider of claim 10 wherein the waveguide core includes at least two bends between the diode laser and the NFT.

14. The HAMR slider of claim 12 wherein each of the stray light absorption layers extends from the first slider surface to the bend closest to the first slider surface.

15. The HAMR slider of claim 10 wherein one or more of the stray light absorption layer ends near the slider first surface is tapered relative to the first surface of the slider.

16. The HAMR slider of claim 10 wherein the stray light absorption layers are formed of a material having an extinction coefficient k greater than 0.3.

17. The HAMR slider of claim 10 wherein one or more of the stray light absorption layers is formed of a material selected from Ru, Co, Cr, W, NiFe, CoFe, NiTa, RuAl, an alloy containing at least 10 atomic percent of one or more of Cr, Ni, Ta and Ru, and C, GaAs and Si.

18. A heat-assisted recording (HAMR) disk drive comprising:
the HAMR slider of claim 10 further comprising a magnetic write head and magnetoresistive read head on the slider; and
a magnetic recording disk having a magnetic recording layer.

* * * * *